United States Patent

Shimodaira et al.

[11] 3,908,802
[45] Sept. 30, 1975

[54] ELECTROMAGNETIC BRAKE
[75] Inventors: Toyohisa Shimodaira; Akio Sato; Ikuo Kumagai, all of Hitachi, Japan
[73] Assignee: Hitachi, Ltd., Japan
[22] Filed: Oct. 30, 1973
[21] Appl. No.: 411,056

[30] Foreign Application Priority Data
Nov. 1, 1972 Japan.............. 47-108816

[52] U.S. Cl........... 188/71.8; 188/171; 188/196 BA
[51] Int. Cl.².................. F16D 55/02; F16D 65/56
[58] Field of Search...... 188/171, 196 BA, 79.5 GE, 188/79.5 K, 72.6, 71.8

[56] References Cited
UNITED STATES PATENTS

| | | | |
|---|---|---|---|
| 2,002,139 | 5/1935 | Des Rosiers | 188/79.5 K |
| 2,214,807 | 9/1940 | Buckley | 188/171 |
| 2,940,553 | 6/1960 | Newell et al. | 188/196 BA |
| 3,117,661 | 1/1964 | Waclawek | 188/79.5 GE |
| 3,129,789 | 4/1964 | Hodkinson | 188/196 BA |
| 3,171,515 | 3/1965 | Wolfe | 188/171 |
| 3,221,845 | 12/1965 | Hansen | 188/171 |
| 3,289,797 | 12/1966 | Brzezinski et al. | 188/171 |
| 3,682,279 | 8/1972 | Palme et al. | 188/171 |
| 3,690,417 | 9/1972 | Airheart | 188/71.8 |

*Primary Examiner*—Trygve M. Blix
*Assistant Examiner*—Edward R. Kazenske
*Attorney, Agent, or Firm*—Craig & Antonelli

[57] ABSTRACT

An electromagnetic brake comprising a brake wheel and a brake shoe arranged to be pressed by joint operation of a link mechanism, a brake rod and an operating lever, wherein a ratchet is secured to an adjust screw adapted to serve as the fulcrum of an adjusting lever such that the ratchet will be turned pitch by pitch with movement of the link or pin of the link mechanism which movement varies in accordance with advance of wear of the brake lining secured to the surface of the brake wheel.

16 Claims, 6 Drawing Figures

3,908,802

ELECTROMAGNETIC BRAKE

BACKGROUND OF THE INVENTION

This invention relates to an electromagnetic brake, and more particularly to a solenoid brake which can be most effectively adapted in an electric hoist, electric chain block or the like.

Usually, a solenoid is used as the actuating power source of the electromagnetic brake adapted in an electric hoist or an electric chain block, and the active force produced by said solenoid is transmitted to the braking unit through a link mechanism.

In this type of electromagnetic brakes, the braking performance (braking torque, braking time, etc.) is gradually lowered as wear of the brake lining advances, and ignorance of such wear could result in a dangerous happening. It is therefore necessary to detect wear of the brake lining by some means or other and to adjust the braking force. Heretofore, such detection of wear of the brake lining has depended on eye-measurement, and when any necessity for adjustment of the braking force is found, such adjustment has been made merely to such an extent that a person thought appropriate. It may be possible to preclude any serious trouble if the braking system is inspected periodically, but if periodic inspection is neglected, there could occur a situation where the braking system is used in a dangerous state with its braking capacity lowered down to a dangerous point. Particularly when a braking system of this type is employed in a loading machine or a vehicle, negligence of periodic inspection could result in a serious accident involving bodily injuries or even death of the operator or other persons.

In view of the above, the present invention has been devised with the object to provide an electromagnetic brake having an automatic brake force adjusting means which is very simple in mechanism. The electromagnetic brake according to the present invention is featured by a link mechanism with which to accomplish desired adjustment of braking force automatically.

More specifically, there is provided according to the present invention an electromagnetic brake having an automatic adjusting device comprising a brake wheel secured to a braking shaft, a brake shoe arranged to be pressed against the brake lining fastened to the surface of said brake wheel, an operating lever adapted to press said brake shoe according to the principle of leverage, a brake rod connected to one end of said operating lever, spring means adapted to constantly press said brake rod toward said brake lining, and a fixed and a movable core whereby said brake rod is urged to move against the force of said spring means through a link mechanism, wherein an end of an adjusting lever swingably pivotted at its middle is connected to a first pin secured to said movable core, with the other end of said lever being joined to a feed lever which has at its end an engaging portion or a bent portion arranged to be constantly pressed against the periphery of a ratchet wheel mounted on an adjust screw serving as a fulcrum of said operating lever, said adjust screw being turned pitch by pitch of the ratchet wheel in accordance with wear of the brake lining, while correcting the position of the end of said adjust screw that serves as fulcrum of the operating lever, thereby to prevent decline of the brake performance.

The above-said and other objects and advantages of the present invention will become apparent from the following detailed description of a preferred embodiment of the present invention as illustrated in the accompanying drawings.

DETAILED DESCRIPTION OF PREFERRED EMBODIMENT

Figure 1:
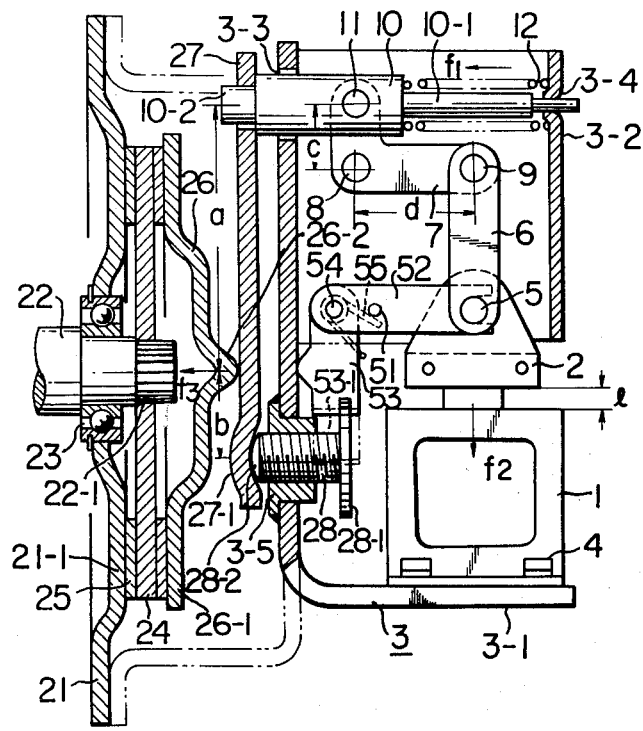
FIG. 1 is a general transverse sectional view of an electromagnetic brake according to the present invention.

Referring first to FIG. 1, reference numeral 1 designates a fixed core around which is coiled a winding (not shown), and 2 a movable core inserted in said fixed core 1 such that it will be attracted by the magnetic attraction produced by the winding coiled around said fixed core 1. The fixed core 1 is secured to a base 3 by screws 4 or other means like other component parts to be described later. The base 3 has a horizontal extension 3-1 to which the fixed core 1 is secured. Numeral 5 indicates a first pin passed through the end of the movable core 2 and connected to a first link 6. 7 is an L-shaped second link which is pivotted at its bent to a second pin 8 which, in turn, is secured to a side portion 3-2 of said base 3. The free end of the straight portion, with length $d$, of said second link 7 is swingably joined to the upper end of said first link 6 by means of a third pin 9, while the free end of another straight portion, with length $c$, of said second link 7 is swingably joined to a brake rod 10, which is to be also described later, by means of a fourth pin 11. Said two straight portions of said second link 7 have the length relation of $c<d$. Both ends of the brake rod 10 is axially slidably fitted in the holes 3-3 and 3-4, respectively, formed in the base 3. The right-hand half of said brake rod 10 is reduced in diameter to form a small-diameter portion 10-1 around which a compression coil spring 12 is wound. This compression spring 12 acts to always press the brake rod 10 to the left as shown by arrow $f_1$ in the drawing.

In operation of the system, when the coil of the fixed core 1 is energized, there is set up a magnetic field acting to attract the movable core 2 in the direction of arrow $f_2$, causing the brake rod 10 to move in the direction opposite to the direction of arrow $f_1$ against elastic force of the compresssion coil spring 12 through the link mechanism. If the fixed core 1 is de-energized, the brake rod 10 is moved back in the direction of arrow $f_1$ to the original position due to the elastic force of the compression coil spring 12 and stays still at this position.

Above described is the mechanism for operating the brake of the present invention. Now, the arrangement of the brake itself is described in detail.

Numeral 21 designates a brake supporting plate which may be secured to said base 3 as shown by a doubledotted line or may be secured to a stationary part by other arrangement, but the former is more desirable for compacting the brake system into a unit. 22 is a braked shaft (driving shaft) for driving an electric hoist or an electric chain block, said shaft being rotatably supported by a bearing 23 provided substantially in the center of said brake supporting plate 21. At the end of said shaft 22 is formed a spline 22-1 on which is mounted a brake wheel 24 which is locked in the direction of rotation. 25 refers to a brake lining made of rubber or such and secured by an adhesive or other means along the peripheral parts on both sides of said brake wheel 24. The brake wheel 24 having the brake linings 25 is, therefore, rotated with the shaft 22. Numeral 26 indicates a brake shoe which is movable axially of said braking shaft 22, as for example in the direction of arrow $f_3$, but which is immovable in the direction of rotation. This brake shoe has a flat peripheral portion 26-1 opposed to said brake lining 25. If the brake lining 25 is curved, said peripheral portion 26-1 of the brake shoe 26 must of course be curved correspondingly. It is also desirable for improving the brake performance and for simplifying the structure to provide the supporting plate 21 with a flat portion 21-1 in opposition to the brake lining 25. At the center of the brake shoe 26 and in alignment with the driven shaft 22 is provided a protuberance 26-2 designed to serve as the acting point of leverage to be described later. 27 refers to an operating lever connected with a certain play to a stepped portion 10-2 at the left end of the brake rod 10 that projects out from said hole 3-3. 28 is an adjust screw threadedly engaged with the boss 3-5 of the base 3 and carrying at its one end a ratchet wheel 28-1. The other end face of said adjust screw 28 is machined to present a spherical or convex face 28-2 which aptly fits in a concave recess 27-1 formed at the end of said operating lever 27. In this leverage system, the stepped portion 10-2 of the brake rod 10 serves as better dynamic point while the spherical portion 28-2 of the adjust screw 28 acts as fulcrum.

Above described is the general structural arrangement of an electromagnetic brake, and now, the operation of the brake having such arrangement is described.

When no voltage is applied to the coil of the fixed core 1, no attractive force is produced by the fixed core 1 and hence the brake rod 10 is pushed in the direction of arrow $f_1$ by the force $f_1$ of the compression coil spring 12, urging corresponding movement of the operating lever 27 in the direction of arrow $f_1$. In the operation of the operating lever 27, its concavity 27-1 contacted with the spherical face 28-2 of the adjust screw 28 serves as fulcrum, the stepped portion 10-2 of the brake rod 10 as dynamic point and the protuberance 26-2 of the brake shoe 26 as point of application. Assuming that the distance from the dynamic point to the point of application is $a$ and the distance from said point of application to the fulcrum is $b$, then the force $f_3$ working to the point of application (protuberance 26-2) of the brake shoe 26 is given by the following formula:

$$f_3 = \frac{a+b}{b} \cdot f_1.$$

This magnified pressing force produces a frictional force between the brake lining 25 of the brake wheel 24 and the brake shoe 26, and the shaft to be braked is quickly stopped rotating by this damping force.

Then, when a voltage is applied to the fixed core 1, the movable core 2 is attracted by the fixed core 1 with the force $f_2$, eliminating the space $l$ which has been formed between the fixed core 1 and movable core 2 by the compression coil spring 12 in the normal state of operation. This behavior causes movement of the operating lever 27 in the direction opposite to the direction of arrow $f_1$ against the repulsive force of the compression coil spring 12, through the first link 6, second link 7 and brake rod 10. In this case, a force of $d/c \cdot f_2$ is given to the brake rod 10, so that if the arrangement is made such as to establish the relation of $d/c \cdot f_2 > f_1$, the brake rod 10 can be easily moved in the direction contrary to the direction of arrow $f_1$, urging coresponding movement in the same direction of the operating lever 27 connected to said brake rod 10. Consequently, the pressing force $f_3$ which has been applied to the brake shoe 26 dies away and hence no braking force is applied.

In the above-described electromagnetic brake system, the brake linings 25 are gradually worn as the frequency of uses or the period of use increases. As the extent of wear rises, the force $f_1$ of the compression coil spring 12 giving pressing force to the brake rod 10 is gradually weakened as the distance there between is increased, and there is finally reached a stage where no sufficient braking force is provided any longer. Such loss of sufficient braking force could result in a serious accident that often involves human casualities. Or the space $l$ may become so large that attracting cannot be caused, and braking force cannot be released.

In order to avoid such danger, the present invention proposes a braking force restoring mechanism whereby the condition of wear of the brake linings 25 is detected and proper adjustment is made automatically to make up for such wear to keep constant the pressing force of the compression coil spring 12, that is, the braking force provided by the brake system.

Wear of the brake lining 25 causes gradual movement of the brake shoe 26 toward said brake lining, with corresponding movement of the brake rod 10. The amount of movement of said brake rod 10 is further increased to $d/c$, ultimately causing movement of the first pin 5 which is secured to the movable core 2.

According to the present invention, the adjust screw 28 or other element specifically designed to act as lever fulcrum is turned by utilizing movement caused by wear of the braking lining 25, so as to vary the position of fulcrum to thereby adjust and maintain the braking force at a constant level and maintain the movement distance $l$ of the movable core at a constant level.

Now, the parts constituting or assoicated with said adjusting mechanism are described with reference to FIG. 1.

Numeral 51 refers to a fixed pin which pivotally supports an adjusting lever 52. Although said fixed pin 51 is shown secured to a side portion 3-2 of the base 3, there may be used other fixing methods. Also, an end of said adjusting lever 52 is coupled in loose fit with the first pin 5 secured to the movable core 2, but such coupling may be simple engagement. At the other end of said adjusting lever 52 is pivotally joined a suspending feed lever 53 by a connecting pin 54. The end of said feed lever 53 is bent to form a pawl 53-1 which is engaged with a tooth of the ratchet wheel 28-1 on the adjust screw 28 as shown in FIG. 2. 55 is a torsion spring coiled around the connecting pin 54, with one end of said torsion spring being held by the fixed pin 51 and the other end by an end face on one side of the feed lever 53. Thus, the torsion spring 55 normally presses the feed lever 53 against the ratchet 28-1 as well as against the side face 3-2 of the base 3. Therefore, the pawl 53-1 of the feed lever 53 is contacted with the ratchet 28-1 always with a certain pressing force so that it won't remove from said ratchet 28-1. Designated by numeral 56 is a leaf spring provided for preventing reversing motion of the adjust screw 28. It is pressed either against the peripheral surface of said adjust screw 28 or against the surface of the ratchet 28-1. Prevention of reverse motion can be accomplished by using other commonly employed means, such as by pressing a leaf spring against the teeth of the ratchet, and any such means can be used without affecting the cause of the present invention.

Now, the operations for automatic adjustment are described with reference to FIG. 2.

Figures 2A, 2B, 2C:
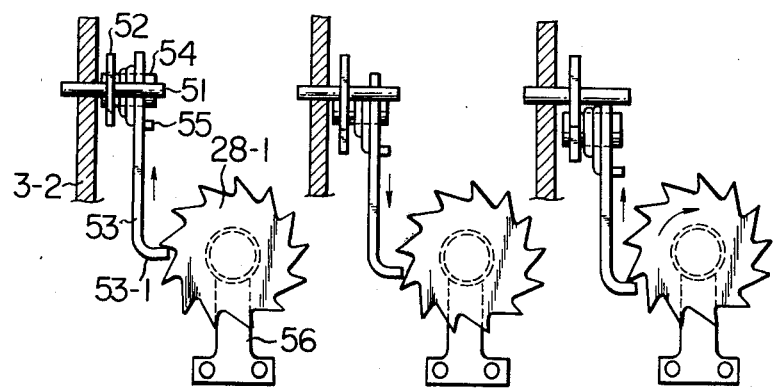
FIGS. 2A, 2B and 2C, and FIGS. 3A and 3B show respectively the modes of operation of the electromagnetic brake.

When no electric current is applied to the coil of the fixed core 1, with hence no attractive force developed by the fixed core, the feed lever 53 stays in the state shown in FIG. 2B, where the brake is being applied by the pressing force of the compression coil spring 12.

Then, when power is connected to the coil of the fixed core 1, the movable core 2 is moved toward the fixed core 1 by the attractive force of the latter to release the brake. This condition is shown in FIG. 2A. The conditions of 2A and 2B are repeated to apply or take off the brake. That is, the end of the bent portion or pawl 53-1 of the feed lever 53 merely slides on the peripheral face of one tooth of the ratchet 28-1 and can not reach the next tooth, so that the adjust screw 28 is not turned and hence its end fulcrum position remains unchanged. However, if wear of the brake lining 25 advances, the brake rod 10 is urged to move in the direction of arrow $f_1$ even in the normal state of operation, and this movement causes gradual rise-up of the movable core 2 through the link mechanism. Gradual rise-up of the movable core 2, that is, gradual enlargement of the space $l$, causes counterclockwise (leftward) turn of the adjusting link 52 pivotted by the fixed pin 51, and this turn of the link 52 causes downward movement of the feed lever 53. Thus, as wear of the brake lining 25 is further increased, the bent portion 53-1 of the feed lever 53 climbs over the tooth with which it has been contacted, and falls down to the root of the next tooth as shown in FIG. 2C. If, under this condition, the coil around the fixed core 1 is energized, the movable core 2 is attracted to the fixed core 1 to accomplish normal release of the brake engagement, and at the same time the feed lever 53 is raised up so that its bent end 53-1 lets the ratchet wheel 28-1 turn through one pitch in the directon of arrow. If arrangement is made such that the adjust screw 28 is moved to the left in FIG. 3B with said turning motion of the ratchet 28-1, the fulcrum of the operating lever 27 is moved to the left. Therefore, inclination of the operating lever 27 is set back to the original position, and the rod 10 is set back to the normal position. In this status, as the fulcrum 28-2 is moved to the left, the operating lever 27 is slightly inclined. Such inclination, however, is so small that it can be ignored in considering the actual braking performance. In the above-described link mechanism, wear of the brake lining 25 is promoted by the link mechanism, so that it is desirable for obtaining correct and secure turning motion of the adjust screw 28 to connect the adjusting lever 52 to the first pin 5. It is thus possible with the present invention to obtain always constant braking performance without increasing the amount of movement of the brake rod 10.

Figures 3A, 3B:
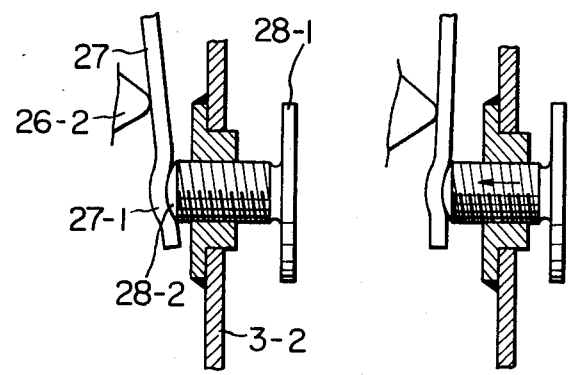

FIG. 3A shows a situation where the operating lever has inclined with wear of the brake lining 25 and no adjustment is yet made, and FIG. 3B shows a situation where the ratchet 28-1 has been turned through one pitch to restore the original (normal) condition. A part near the end of the operating lever 27 is curved to form a concavity 27-1 as shown in the drawings. It is designed to coact with the convexity 28-2 at the end of the adjust screw 28 to ensure smooth swinging motion at the pivot of the operating lever 27. However the part may be formed in flat shape.

As described above, the device of the present invention is capable of maintaining the braking performance of an electromagnetic brake constantly at a preset capacity regardless of wear of the brake lining, thus precluding any possibility of a serious accident that could be caused by reduced working efficiency of the brake.

What we claim is:

1. An electromagnetic brake comprising
   a braking shaft extending in a longitudinal axial direction,
   a brake wheel secured to said braking shaft for rotation therewith,
   brake linings secured to said brake wheel,
   a brake shoe provided in opposition to said brake linings on one side of said brake wheel, said brake shoe being movable only in the axial direction of said braking shaft,
   an operating lever for exerting force on said brake shoe according to the principle of leverage, said operating lever having one end of an adjust screw acting as a fulcrum thereof, said adjust screw being threadedly engaged with a base,
   a brake rod connected to said operating lever to transmit operative force to said operating lever,
   spring means for biasing said brake rod to press said brake shoe against the brake linings through the operating lever,
   a link mechanism connected to the brake rod,
   a movable core connected to said link mechanism,
   a fixed core having an exciting coil wound therearound for attracting said movable core with magnetic atrractive forces in opposition to the biasing of said spring means, and
   means for turning said adjust screw in accordance with movement of said movable core which is effected by wear of said brake linings.

2. An electromagnetic brake comprising
   a braking shaft extending in a longitudinal axial direction,
   a brake wheel secured to said braking shaft for rotation therewith,
   brake linings secured to said brake wheel,
   a brake shoe provided in opposition to said brake linings on one side of said brake wheel, said brake shoe being movable only in the axial direction of said braking shaft,
   an operating lever for exerting force on said brake shoe according to the principle of leverage, said operating lever having one end of an adjust screw acting as a fulcrum thereof, said adjust screw being threadedly engaged with a base and having mounted thereon a ratchet,
   a brake rod connected to said operating lever to transmit operative force to said operating lever,
   spring means for biasing said brake rod to press said brake shoe against the brake linings through the operating lever,
   a link mechanism connected to the brake rod, a movable core connected to said link mechanism, a fixed core having an exciting coil wound therearound for attracting said movable core with magnetic attractive force in opposition to the biasing of said spring means, an adjusting lever pivotally connected to the movable core at a first end of said adjusting lever, a first pin for connecting said adjusting lever to said movable core, a feed lever pivotally connected at a second end of said adjusting lever, a connecting pin for connecting said feed lever to said adjusting lever, a fixed pin for pivotally mounting said adjusting lever, and a pawl at an end of said feed lever apart from the connection with said adjusting lever for engaging said ratchet, said pawl rotating said adjust screw by means of said ratchet in accordance with movement of said movable core effecting pivoting action of said adjusting lever and said feed lever such that said pawl and ratchet engage as a function of brake lining wear, and torsion spring means for constantly pressing said pawl against said ratchet.

3. An electromagnetic brake comprising an axially extending braking shaft, at least one brake wheel secured to said braking shaft for rotation therewith, brake linings secured to said brake wheel, brake shoe means for engaging said brake linings, said brake shoe means being configured to mate with said brake linings, and said brake shoe means being movable in a direction parallel to said axially extending braking shaft, operating lever means for applying force to said brake shoe means, thereby engaging said brake shoe means with said brake linings, said operating lever means having first and second ends with said force applied to said brake shoe means at a point of said operating lever means intermediate of said first and second ends, said operating lever means being pivoted about a fulcrum at said first end, an adjust screw threadedly engaged with a base, said adjust screw having one end acting as said fulcrum, electromagnetic force effecting means for effecting an operative force to said second end of said operating lever means to engage said brake shoe means with said brake linings by lever action about said fulcrum, and adjusting means for adjusting said fulcrum as a function of brake lining wear, said adjusting means including means for turning said adjust screw in response to said brake lining wear.

4. An electromagnetic brake according to claim 3, wherein said electromagnetic force effecting means includes a movable brake rod having first and second ends, said first end of said brake rod being coupled to said second end of said operating lever means, biasing spring means for applying a biasing force against said second end of said brake rod, thereby effecting said operative force to said operating lever means, electromagnetic core means having a movable core and a fixed core for effecting magnetic forces between said movable and fixed core such that said movable core is relatively movable to said fixed core, and linkage means for linking said movable brake rod with said movable core to effect movement of said brake rod by said movable core.

5. An electromagnetic brake comprising an axially extending braking shaft, at least one brake wheel secured to said braking shaft for rotation therewith, brake linings secured to said brake wheel, brake shoe means for engaging said brake linings, said brake shoe means being configured to mate with said brake linings, and said brake shoe means being movable in a direction parallel to said axially extending braking shaft, operating lever means for applying force to said brake shoe means, thereby engaging said brake shoe means with said brake linings, said operating lever means having first and second ends with said force applied to said brake shoe means at a point of said operating lever means intermediate of said first and second ends, said operating lever means being pivoted about a fulcrum at said first end, electromagnetic force effecting means for effecting an operative force to said second end of said operating lever means to engage said brake shoe means with said brake linings by lever action about said fulcrum, and adjusting means for adjusting said fulcrum as a function of brake lining wear, wherein said electromagnetic force effecting means includes a movable brake rod having first and second ends, said first end of said brake rod being coupled to said second end of said operating lever means, biasing spring means for applying a biasing force against said second end of said brake rod, thereby effecting said operative force to said operating lever means, electromagnetic core means having a movable core and a fixed core for effecting magnetic forces between said movable and fixed cores such that said movable core is relatively movable to said fixed core, and linkage means for linking said movable brake rod with said movable core to effect movement of said brake rod by said movable core, and wherein said linkage means includes a first link having a longitudinal extent and a second L-shaped link having first and second legs and being pivotally mounted where said first and second legs are joined, said first leg being longer than said second leg, and wherein said first link is pivotally connected to said movable core at a first end of said first link and pivotally connected to said first leg of said second link at a second end of said first link, said second link pivotally connected to said movable brake rod at said second leg.

6. An electromagnetic brake according to claim 5, wherein said magnetic forces of said electromagnetic core means are multiplied by a ratio of the length of said first leg to the length of said second leg to be greater than said biasing force so that said brake rod is moved away from said operating lever means.

7. An electromagnetic brake according to claim 6, wherein said adjusting means includes and adjusting screw mounted with one end acting as said fulcrum, a ratchet mounted for moving said adjusting screw, a pawl mounted in cooperation with said ratchet, and an adjusting linkage means connected to said movable core and said pawl for moving said ratchet by said pawl.

8. An electromagnetic brake according to claim 7, wherein said adjusting linkage means includes an adjusting lever pivotal about a fixed pin, said adjusting lever having a first end coupled with said movable core, and a feed lever pivotally connected to a second end of said adjusting lever, said pawl being formed at a free end of said feed lever.

9. An electromagnetic brake according to claim 8, wherein said adjusting linkage mechanism further includes a torsion spring for normally holding said pawl against said ratchet.

10. An electromagnetic brake comprising
an axially extending braking shaft,
at least one brake wheel secured to said braking shaft for rotation therewith,
brake linings secured to said brake wheel,
brake shoe means for engaging said brake linings, said brake shoe means being configured to mate with said brake linings, and said brake shoe means being movable in a direction parallel to said axially extending braking shaft,
operating lever means for applying force to said brake shoe means, thereby engaging said brake shoe means with said brake linings, said operating lever means having first and second ends with said force applied to said brake shoe means at a point of said operating lever means intermediate of said first and second ends, said operating lever means being pivoted about a fulcrum at said first end,
electromagnetic force effecting means for effecting an operative force to said second end of said operating lever means to engage said brake shoe means with said brake linings by lever action about said fulcrum, wherein said electromagnetic force effecting means includes a movable brake rod having first and second ends, said first end of said brake rod being coupled to said second end of said operating lever means, biasing spring means for applying a biasing force against said second end of said brake rod, thereby effecting said operative force to said operating lever means, electromagnetic core means having a movable core and a fixed core for effecting magnetic forces between said movable and fixed cores such that said movable core is relatively movable to said fixed core, and linkage means for linking said movable brake rod with said movable core to effect movement of said brake rod by said movable core, and
adjusting means for adjusting said fulcrum as a function of brake lining wear, wherein said adjusting means includes an adjusting screw mounted with one end acting as said fulcrum, a ratchet mounted for moving said adjusting screw, a pawl mounted in cooperation with said ratchet, and an adjusting linkage means connected to said movable core and said pawl for moving said ratchet by said pawl.

11. An electromagnetic brake according to claim 10, wherein said adjusting linkage means includes an adjusting lever pivotal about a fixed pin, said adjusting lever having a first end coupled with said movable core, and a feed lever pivotally connected to a second end of said adjusting lever, said pawl being formed at a free end of said feed lever.

12. An electromagnetic brake according to claim 11, wherein said adjusting linkage mechanism further includes a torsion spring for normally holding said pawl against said ratchet.

13. An electromagnetic brake comprising
an axially extending braking shaft,
at least one brake wheel secured to said braking shaft for rotation therewith,
brake linings secured to said brake wheel,
brake shoe means for engaging said brake linings, said brake shoe means being configured to mate with said brake linings, and said brake shoe means being movable in a direction parallel to said axially extending braking shaft,
operating lever means for applying force to said brake shoe means, thereby engaging said brake shoe means with said brake linings, said operating lever means having first and second ends with said force applied to said brake shoe means at a point of said operating lever means intermediate of said first and second ends, said operating lever means being pivoted about a fulcrum at said first end,
electromagnetic force effecting means for effecting an operative force to said second end of said operating lever means to engage said brake shoe means with said brake linings by lever action about said fulcrum, and
adjusting means for adjusting said fulcrum as a function of brake lining wear, wherein said adjusting means includes an adjusting screw mounted with one end acting as said fulcrum, a ratchet mounted for moving said adjusting screw, a pawl mounted in cooperation with said ratchet, and an adjusting linkage means connected to said electromagnetic force effecting means and said pawl for moving said ratchet by said pawl.

14. An electromagntic brake according to claim 13, wherein said adjusting linkage means includes an adjusting lever pivotal about a fixed pin, said adjusting lever having a first end coupled with said electromagnetic force effecting means, and a feed lever pivotally connected to a second end of said adjusting lever, said pawl being formed at a free end of said feed lever.

15. An electromagnetic brake according to claim 14, wherein said adjusting linkage mechanism further included a torsion spring for normally holding said pawl against said ratchet.

16. An electromagnetic brake according to claim 3, wherein said intermediate point of said operating lever means is located at a shorter distance to said fulcrum than the distance between said intermediate point and a point of said operating lever means where said operative force is effected.

* * * * *